(12) United States Patent
Spangler et al.

(10) Patent No.: US 10,227,927 B2
(45) Date of Patent: Mar. 12, 2019

(54) SUPPLY DUCT FOR COOLING AIR FROM GAS TURBINE COMPRESSOR

(71) Applicant: UNITED TECHNOLOGIES CORPORATION, Hartford, CT (US)

(72) Inventors: Brandon W. Spangler, Vernon, CT (US); Ricardo Trindade, Coventry, CT (US)

(73) Assignee: United Technologies Corporation, Farmington, CT (US)

( * ) Notice: Subject to any disclaimer, the term of this patent is extended or adjusted under 35 U.S.C. 154(b) by 334 days.

(21) Appl. No.: 14/900,730

(22) PCT Filed: Jul. 2, 2014

(86) PCT No.: PCT/US2014/045175
§ 371 (c)(1),
(2) Date: Dec. 22, 2015

(87) PCT Pub. No.: WO2015/009449
PCT Pub. Date: Jan. 22, 2015

(65) Prior Publication Data
US 2016/0131037 A1 May 12, 2016

Related U.S. Application Data

(60) Provisional application No. 61/847,104, filed on Jul. 17, 2013.

(51) Int. Cl.
*F01D 9/06* (2006.01)
*F02C 7/18* (2006.01)
(Continued)

(52) U.S. Cl.
CPC ............... *F02C 7/18* (2013.01); *F01D 5/081* (2013.01); *F01D 5/082* (2013.01); *F01D 5/084* (2013.01);
(Continued)

(58) Field of Classification Search
CPC . F01D 5/08; F01D 5/081; F01D 5/082; F01D 5/084; F01D 5/085087;
(Continued)

(56) References Cited

U.S. PATENT DOCUMENTS 3,952,501 A * 4/1976 Saintsbury ............... F23R 3/26
60/39.23
4,374,466 A   2/1983 Sotheran
(Continued)

FOREIGN PATENT DOCUMENTS

EP   1033484 A2   9/2000
EP   2375005 A2   10/2011
(Continued)

OTHER PUBLICATIONS

Supplementary European Search Report for European Application No. 14826896.4 dated Jul. 6, 2016.
(Continued)

*Primary Examiner* — Gerald L Sung
*Assistant Examiner* — Marc Amar
(74) *Attorney, Agent, or Firm* — Carlson, Gaskey & Olds, P.C.

(57) ABSTRACT

In a featured embodiment, a gas turbine engine has a compressor section having a downstream rotor and a diffuser downstream of the compressor section. A combustor receives air downstream of the diffuser. A turbine section has at least one component to be cooled. A conduit is spaced from the diffuser and defines a cooling airflow path. The cooling airflow path is separate from an airflow downstream the diffuser, and passing to the combustor. The conduit passes cooling air to the component to be cooled.

11 Claims, 2 Drawing Sheets

(51) Int. Cl.
- *F01D 5/08* (2006.01)
- *F01D 25/12* (2006.01)
- *F01D 25/08* (2006.01)
- *F01D 25/14* (2006.01)
- *F02C 3/04* (2006.01)
- *F02C 6/08* (2006.01)

(52) U.S. Cl.
CPC ............ *F01D 5/085* (2013.01); *F01D 5/088* (2013.01); *F01D 9/06* (2013.01); *F01D 9/065* (2013.01); *F01D 25/08* (2013.01); *F01D 25/12* (2013.01); *F01D 25/14* (2013.01); *F02C 3/04* (2013.01); *F02C 6/08* (2013.01); *F05D 2220/32* (2013.01); *F05D 2260/205* (2013.01); *F05D 2260/232* (2013.01); *F05D 2270/3062* (2013.01); *Y02T 50/676* (2013.01)

(58) Field of Classification Search
CPC . F01D 5/088; F01D 9/06; F01D 9/065; F01D 25/08; F01D 25/12; F01D 5/085; F01D 5/087; F02C 7/12; F02C 7/18; Y02T 50/676

See application file for complete search history.

(56) References Cited

U.S. PATENT DOCUMENTS

| | | | |
|---|---|---|---|
| 4,807,433 A | 2/1989 | Maclin et al. | |
| 5,329,761 A | 7/1994 | Ablett et al. | |
| 6,058,710 A * | 5/2000 | Brehm | F23R 3/34 60/747 |
| 6,334,297 B1 * | 1/2002 | Dailey | F23R 3/04 60/751 |
| 6,584,778 B1 | 7/2003 | Griffiths et al. | |
| 6,672,072 B1 * | 1/2004 | Giffin, III | F01D 5/08 60/728 |
| 7,055,306 B2 | 6/2006 | Jones et al. | |
| 7,225,624 B2 * | 6/2007 | Ress, Jr. | F01D 5/082 60/782 |
| 8,142,141 B2 | 3/2012 | Tesh et al. | |
| 8,240,153 B2 | 8/2012 | Childers et al. | |
| 8,371,127 B2 | 2/2013 | Durocher et al. | |
| 8,402,770 B2 | 3/2013 | Garin et al. | |
| 8,668,431 B2 * | 3/2014 | Rog | F01D 11/24 415/1 |
| 2003/0141388 A1 * | 7/2003 | Johnson | F23R 3/16 239/550 |
| 2004/0036230 A1 * | 2/2004 | Matsuda | F01D 9/023 277/632 |
| 2004/0040309 A1 | 3/2004 | Ziegner | |
| 2005/0210881 A1 * | 9/2005 | Balan | C01B 3/34 60/780 |
| 2005/0268619 A1 * | 12/2005 | Ress, Jr. | F01D 5/082 60/782 |
| 2007/0193248 A1 * | 8/2007 | Bessagnet | F23R 3/06 60/39.01 |
| 2010/0257869 A1 * | 10/2010 | Cornelius | F01D 25/12 60/782 |
| 2011/0236179 A1 * | 9/2011 | Rog | F01D 11/24 415/1 |
| 2012/0060507 A1 | 3/2012 | King et al. | |

FOREIGN PATENT DOCUMENTS

| | | | |
|---|---|---|---|
| FR | 2030993 A5 * | 11/1970 | ............ F01D 11/025 |
| GB | 2084654 A | 4/1982 | |

OTHER PUBLICATIONS

International Search Report for PCT Application No. PCT/US2014/045175.

International Preliminary Report on Patentability for International Application No. PCT/US2014/045175 dated Jan. 28, 2016.

\* cited by examiner

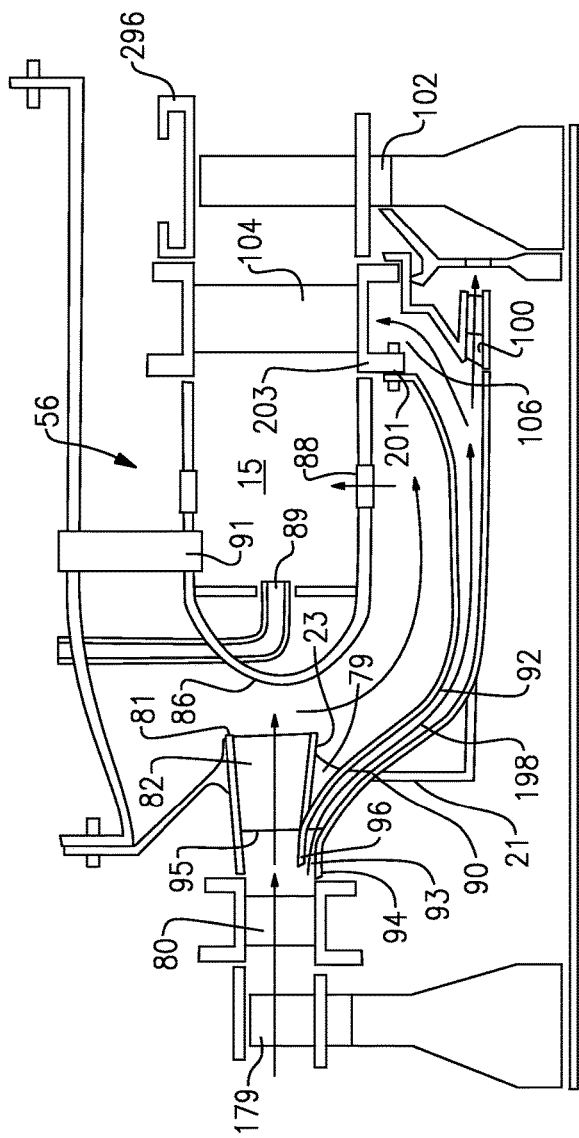
FIG.2
FIG.3
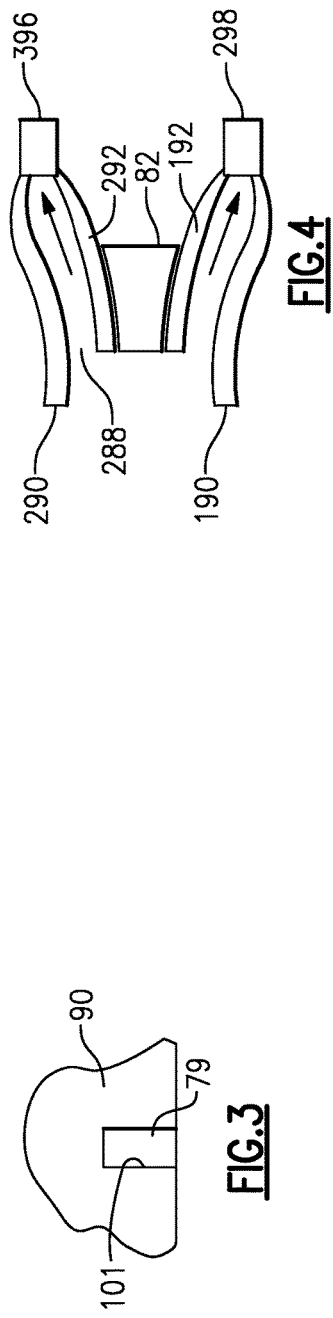
FIG.4

SUPPLY DUCT FOR COOLING AIR FROM GAS TURBINE COMPRESSOR

CROSS-REFERENCE TO RELATED APPLICATION

This application claims priority to U.S. Provisional Application No. 61/847,104, filed Jul. 17, 2013.

BACKGROUND

This application relates to a supply duct for supplying cooling air with minimal pressure loss.

Gas turbine engines are known and, typically, include a fan delivering air into a compressor. The air is compressed and delivered into a combustor section where it is mixed with fuel and ignited. Products of this combustion pass downstream over turbine rotors driving them to rotate.

The products of combustion are quite hot and cooling air is typically provided to a number of locations within the gas turbine engine.

In addition, the flow of air to the combustor section is closely controlled. Often, a diffuser is positioned immediately upstream of the combustor section and serves to prepare the air for delivery into the combustor section. Due to various packaging realities, the airflow downstream of the diffuser is turned through an approximately 90 degree angle and then back into an inlet through another 90 degree angle.

In the prior art, this same airflow is utilized as a source of cooling air.

SUMMARY

In a featured embodiment, a gas turbine engine has a compressor section having a downstream rotor and a diffuser downstream of the compressor section. A combustor receives air downstream of the diffuser. A turbine section has at least one component to be cooled. A conduit is spaced from the diffuser and defines a cooling airflow path. The cooling airflow path is separate from an airflow downstream the diffuser, and passing to the combustor. The conduit passes cooling air to the component to be cooled.

In another embodiment according to the previous embodiment, the cooling airflow path is tapped from a location downstream of the downstream rotor, and upstream of the diffuser.

In another embodiment according to any of the previous embodiments, the conduit is provided by a pair of radially spaced shells.

In another embodiment according to any of the previous embodiments, the shells are positioned radially inwardly of the diffuser and the combustor.

In another embodiment according to any of the previous embodiments, shells are also positioned radially outwardly of the diffuser and the combustor section to provide a second cooling airflow path.

In another embodiment according to any of the previous embodiments, the component to be cooled includes at least one of a turbine vane, a turbine rotor, and a blade outer air seal.

In another embodiment according to any of the previous embodiments, one of the shells has a downstream end secured to a base of the turbine vane to provide cooling air to the turbine vane.

In another embodiment according to any of the previous embodiments, the cooling airflow path, downstream of the shells, passes into an injector tube for supplying cooling air to the turbine rotor.

In another embodiment according to any of the previous embodiments, one of the shells has an upstream end positioned downstream of an upstream end of a second of the shells to provide an open inlet into the cooling airflow path.

In another embodiment according to any of the previous embodiments, one of the shells is positioned closer to an outer surface of the diffuser than the second of the shells.

In another embodiment according to any of the previous embodiments, the shells and the cooling air path are positioned radially outwardly of the diffuser and the combustor section.

In another embodiment according to any of the previous embodiments, the component to be cooled includes a blade outer air seal.

In another embodiment according to any of the previous embodiments, the diffuser is mounted by a mount structure to an inner housing.

In another embodiment according to any of the previous embodiments, at least one of the shells has a slot to be received on the mount structure.

In another embodiment according to any of the previous embodiments, one of the shells has an upstream end positioned downstream of an upstream end of a second of the shells to provide an open inlet into the cooling airflow path.

In another embodiment according to any of the previous embodiments, the component to be cooled includes at least one of a turbine vane, a turbine rotor, and a blade outer air seal.

In another embodiment according to any of the previous embodiments, the conduit is provided by a pair of radially spaced shells.

In another embodiment according to any of the previous embodiments, one of the shells has a downstream end secured to a base of the turbine vane to provide cooling air to the turbine vane.

In another embodiment according to any of the previous embodiments, the cooling airflow path, downstream of the shells, passes into an injector tube for supplying cooling air to the turbine rotor.

In another embodiment according to any of the previous embodiments, a combustor housing is positioned downstream of an outlet of the diffuser, such that air downstream of the diffuser bends through an approximately ninety degree angle in one radial direction, then moves back through an approximately ninety degree angle through an inlet port into a combustion chamber.

These and other features may be best understood from the following drawings and specification.

BRIEF DESCRIPTION OF THE DRAWINGS

FIG. 2 shows a portion of the gas turbine engine of FIG. 1.

FIG. 3 shows one mechanical feature of the FIG. 2 structure.

FIG. 4 shows an alternative embodiment.

DETAILED DESCRIPTION

Figure 1:
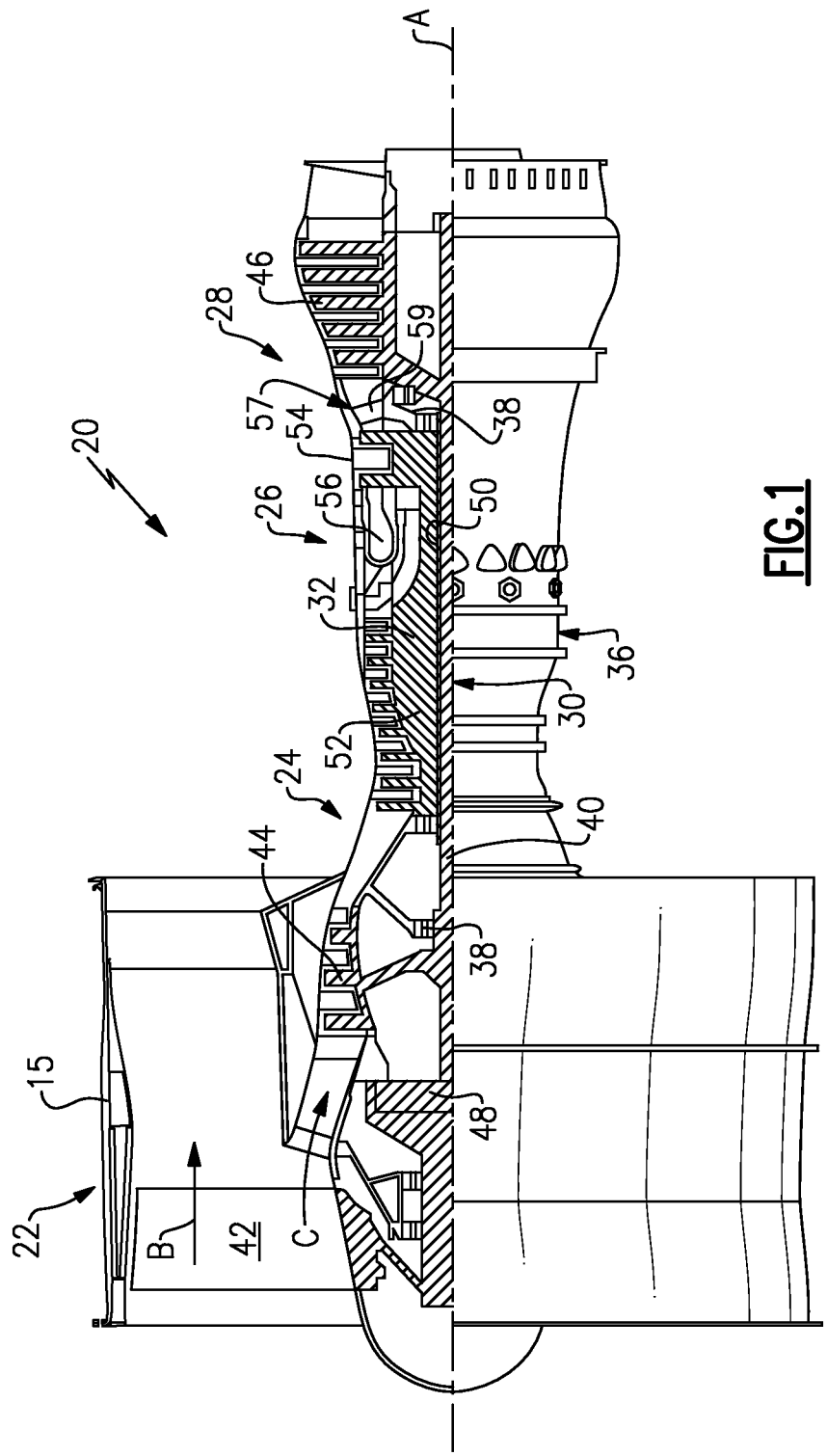
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °\text{R})/(518.7° \text{R})]^{0.5}$. The "Low corrected fan tip speed" as disclosed herein according to one non-limiting embodiment is less than about 1150 ft/second.

FIG. 2 shows a downstream-most compressor rotor 179 and a downstream most compressor vane 80. This may be part of an engine such as shown in FIG. 1. Downstream of the compressor vane 80 is a diffuser 82. As known, the diffuser has an upstream end 95 and a downstream exit 81 that is typically of a larger cross-sectional area than the upstream end 95.

A plurality of circumferentially spaced mount structures 79 mount the diffuser 82 to a radially inner housing 21.

Downstream of the diffuser exit 81 is a portion 86 of a housing for a combustion section 56. As shown by arrows, part of the air leaving the exit 81 bends through a radially inward direction (approximately through a ninety degree angle), then flows axially along an outer surface of the housing 86, then radially outwardly (again, approximately through a ninety degree angle) into ports 88 and into a combustion chamber 15. Fuel is injected through elements 89 and an igniter 91 ignites the fuel and air within the combustion chamber 15. Products of this combustion pass downstream over a vane 104 and a turbine rotor 102.

As is known, the turbine vane 104 and turbine rotor 102 will become quite hot due to the products of combustion. Thus, cooling air is provided. In the past, part of the air flowing to ports 88 was diverted as cooling air.

In this disclosure, a conduit is formed of a radially inner shell 90 and a radially outer shell 92 to provide a flow path 198 from an inlet 93. As shown, an upstream end 94 of the inner shell 90 is more upstream than an upstream end 96 of the outer shell 92. As can be seen, the upstream end 96, which is downstream of upstream end 94, is on the outer shell 92, which is closer to an outer surface 23 of diffuser 82 than is shell 90. The forward facing inlet provided by this positioning results in a reduced pressure drop across the inlet 93. As can be appreciated, the shells extend for 360° about a center axis (A) of the engine.

Air flows through the path 198 and exits through exit port 106 and injector tube 100. The air exiting port 106 cools the turbine vane 104, while the air through the injector tube 100 is aimed at the inner bore of the turbine rotor 102.

By utilizing the separate cooling air flow path 198, pressure losses across the diffuser 82, and through the bending of the air on the way to the inlet 88 do not occur to the cooling air being delivered to the vane 104 and the rotor 102. As such, more efficient use of the cooling air is achieved.

As also shown in FIG. 2, an inner end 201 of the outer shell 92 abuts against an inner surface 203 or base of the turbine vane 104 such that the air is delivered into the inner surface 203 of the turbine vane 104.

FIG. 3 shows a feature that may be found in both the inner and outer shells 90 and 92, but is illustrated at the inner shell 90. As shown, the mount structures 79 may be received within slots 101 in the shell 90. Thus, there are effective vane structures within the cooling air path 198.

FIG. 4 schematically shows an alternative embodiment wherein there are shells 190 and 192 at a radially inner end delivering air to the uses 298 which may be schematically a vane, such as turbine vane 104 and a rotor, such as turbine rotor 102. An outer flow path 288 is provided radially outwardly of the diffuser 82 by two shells 290 and 292 and delivers air, such as to a use 396, which may be radially outward of the combustor 56. As an example, the use 396 may be a blade outer air seal 296, such as shown in FIG. 2.

The use of the dedicated shells to provide the cooling air path result in very efficient use of the cooling airflow. While shells are shown as a conduit defining a cooling air passage, any other method of providing a conduit to define a cooling airflow path separate from the combustion flow path can be utilized. As an example, the shells could be split into several circumferentially spaced pieces, and bolted together. Alternatively, axial ribs can extend the length of the shells and tie them together structurally. Alternatively, there could be individual tubes that carry the airflow from aft of the compressor to the components to be cooled. Again any number of other ways of defining a separate flow path would come within the scope of this disclosure.

Since the inlet to the cooling air passages faces axially forwardly, or toward an upstream end, the air delivered into the passage sees a total pressure, rather than just static pressure. As can be appreciated from FIG. 2, the shape of the cooling air path is smooth, and has no sharp bends which could reduce the pressure of the air.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a compressor section having a downstream rotor and a diffuser downstream of said compressor section;
a combustor, said combustor for receiving air downstream of the diffuser;
a turbine section having at least one component to be cooled;
a cooling airflow conduit spaced from said diffuser and defining a cooling airflow path, said cooling airflow path being separate from an airflow downstream said diffuser, and passing to said combustor, with said conduit passing cooling air to said component to be cooled; said cooling airflow path is tapped from a location downstream of said downstream rotor, and upstream of said diffuser;
said conduit is provided by a pair of radially spaced shells
one of said shells has an upstream end positioned downstream of an upstream end of a second of said shells to provide a forward facing open inlet into said cooling airflow path;
additional shells positioned radially outwardly of said diffuser and said combustor to provide a second cooling airflow path; and
a combustor housing is positioned downstream of an outlet of said diffuser, such that air downstream of said diffuser bends through an approximately ninety degree angle in one radial direction, then moves back through an approximately ninety degree angle through an inlet port into a combustion chamber.

2. The gas turbine engine as set forth in claim 1, wherein said shells are positioned radially inwardly of said diffuser and said combustor, and each of said shells extend about 360° of a rotational axis of said turbine section.

3. The gas turbine engine as set forth in claim 1, wherein said component to be cooled includes at least one of a turbine vane, a turbine rotor, and a blade outer air seal.

4. The gas turbine engine as set forth in claim 3, wherein one of said shells has a downstream end secured to a base of said turbine vane to provide cooling air to said turbine vane.

5. The gas turbine engine as set forth in claim 3, wherein said cooling airflow path, downstream of said shells, passes into an injector tube for supplying cooling air to said turbine rotor.

6. The gas turbine engine as set forth in claim 5, wherein one of said shells is positioned closer to an outer surface of said diffuser than the second of said shells.

7. The gas turbine engine as set forth in claim 1, wherein said component to be cooled includes a blade outer air seal.

8. The gas turbine engine as set forth in claim 1, wherein said diffuser is mounted by a mount structure to an inner housing.

9. The gas turbine engine as set forth in claim 8, wherein at least one of said shells has a slot to be received on said mount structure.

10. The gas turbine engine as set forth in claim 1, wherein one of said shells has a downstream end secured to a base of a turbine vane to provide cooling air to said turbine vane.

11. The gas turbine engine as set forth in claim 10, wherein said cooling airflow path, downstream of said shells, passes into an injector tube for supplying cooling air to said turbine rotor.

* * * * *